UNITED STATES PATENT OFFICE.

CHARLES F. CROSS AND EDWARD J. BEVAN, OF LONDON, AND CLAYTON BEADLE, OF ERITH, ENGLAND, ASSIGNORS TO CELLULOSE PRODUCTS COMPANY, OF WILMINGTON, DELAWARE.

METHOD OF TREATING VISCOSE AND PRODUCTS DERIVED THEREFROM.

SPECIFICATION forming part of Letters Patent No. 717,355, dated December 30, 1902.

Application filed April 1, 1901. Serial No. 53,992. (No specimens.)

*To all whom it may concern:*

Be it known that we, CHARLES FREDERICK CROSS and EDWARD JOHN BEVAN, residing at 4 New Court, Carey street, London, and CLAYTON BEADLE, residing at Erith, in the county of Kent, England, all citizens of England, have invented a certain new and useful Method of Treating Viscose and Products Derived Therefrom, (for which we have applied for a patent in Great Britain, dated February 19, 1901, No. 3,592,) of which the following is a specification.

The soluble compound of cellulose obtained by treating it with an alkaline hydroxid and carbon disulfid, as described in our specification No. 8,700 of 1892, is a crude product containing the alkali cellulose xanthate in admixture with various by-products. These by-products are formed in the original reaction and continue to be formed during the process of dissolving the product and also progressively all the time that the aqueous solution or viscose is stored. These by-products are, in the case of soda viscose, chiefly sodium carbonate and sulfo-carbonates. The presence of these by-products in the crude viscose has greatly limited the useful industrial applications of this substance.

We have now found that the alkali cellulose xanthate resists the action of acetic acid, while the alkaline hydrate and the alkali salts present in the solution or viscose are at once converted by this acid into acetate. In the case of the alkaline carbonates, sulfo-carbonates, &c., the weak acids, combined with the alkali, are liberated and pass off in form of gas or vapor. It follows from this observation that viscose may be treated with acetic acid or other acids of weak affinity, such as lactic acid or formic acid, in excess without decomposing the cellulose compound in solution. If the action of the acid is accompanied by that of a neutral dehydrating agent, such as brine or alcohol, in sufficient quantity, the cellulose compound is precipitated as an alkaline salt, and it has a non-gelatinous consistence, so that it readily parts with the mother-liquors on being pressed or subjected to centrifugal action. For further purification it may be washed with diluted brine or in some cases with dilute alcohol before pressing. The precipitate may be washed to remove saline by-products (acetates) and may then be redissolved in water to form a colorless and inodorous solution.

The product obtained as above described from ordinary viscose is thus the purified alkali cellulose xanthate. This relatively pure viscose can be applied to various purposes for which crude viscose is unfitted, as for the sizing and coating of paper of high grades, for warp-sizing, and for finishing textile fabrics.

If the acidification be carried out in a closed vessel, volatile sulfur compounds may be recovered. The brine-bath from which the compound has been precipitated contains acetate of the alkali metal. On adding hydrochloric acid this is decomposed, and the acetic acid liberated is available for the next operation.

In its pure form the compound is neutral in reaction, the alkali which it contains being united to an acid of strong affinity, as shown by its resisting the action not only of acetic acid, but also of acids of stronger affinity. Thus of the acids of or derived from the aromatic hydrocarbon salicylic acid can be added in excess to viscose without decomposing the cellulose compound. This general resistance of the alkali salt of cellulose xanthic acid to the weaker acids allows the use of viscose in cases where it was inapplicable by reason of the presence of the by-products, chiefly alkaline carbonates and sulfo-carbonates. Thus without separating and redissolving the pure compound we can employ for various industrial purposes the solution of acid reaction prepared from a crude viscose by merely adding an acid of weak affinity. We may also use the crude but acidified solution for preparing the insoluble salts of the cellulose xanthic acid with the heavy metals. Thus to the acidified solution zinc acetate is added in slight excess and the zinc salt of the said xanthic acid is obtained. It may be washed free from alkali salts and dissolved in certain alkaline solutions, such as ammonia.

Instead of first treating the crude viscose with acetic or like acid and then with a dehydrating agent, as above described, we may invert the process, treating the viscose first with the dehydrating agent—brine or alcohol—and then in the presence of this agent treating the precipitated xanthate with the weak acid, the dehydrating agent being in sufficient quantity to prevent solution of the precipitate.

Having thus described the nature of this invention and the best means we know of carrying the same into practical effect, we claim—

1. The herein-described treatment of viscose for the preparation of useful products therefrom by adding to it a weak acid, such as acetic acid, and for isolation of the purified alkali cellulose xanthate associating with the acid treatment the action of a neutral dehydrating agent, such as brine or alcohol.

2. As a new article of manufacture, the pure salts of the cellulose xanthic acids.

In testimony whereof we have hereunto set our hands in presence of two subscribing witnesses.

C. F. CROSS.
EDWARD J. BEVAN.
CLAYTON BEADLE.

Witnesses:
W. M. HARRIS,
GERALD L. SMITH.